Feb. 22, 1955   H. BRENNER   2,702,713
CHUCK
Filed May 29, 1952   2 Sheets-Sheet 1
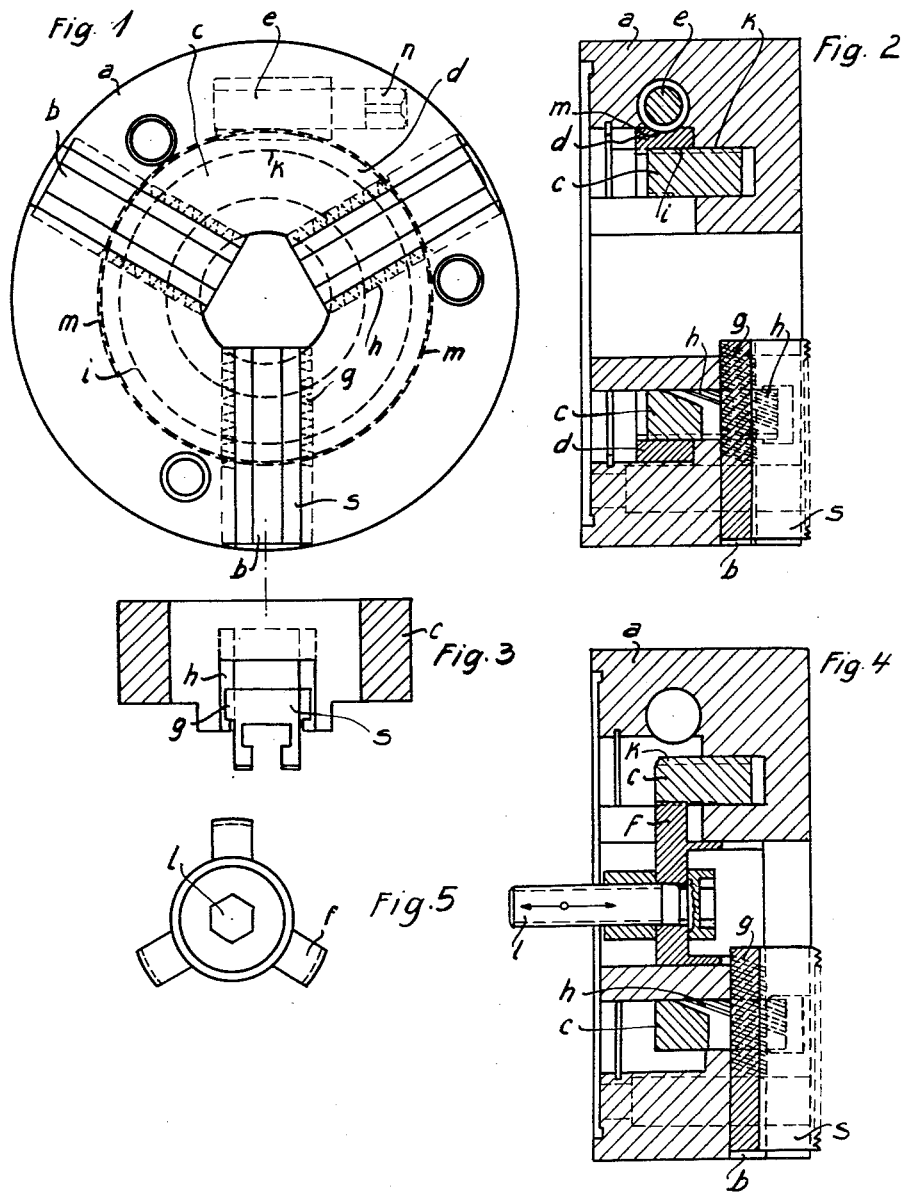
INVENTOR:
Hermann Brenner
BY
Richard Geier
ATTORNEYS Feb. 22, 1955  H. BRENNER  2,702,713
CHUCK Filed May 29, 1952  2 Sheets-Sheet 2

INVENTOR:
HERMANN BRENNER
By Richards v Geier
ATTORNEYS

United States Patent Office 2,702,713
Patented Feb. 22, 1955

2,702,713

CHUCK

Hermann Brenner, Neu-Isenburg, Germany

Application May 29, 1952, Serial No. 290,743

5 Claims. (Cl. 279—110)

Chucks, mainly constructed as three-jaw chucks, have the object of clamping firmly round workpieces during the machining operation, with the further purpose of centering the workpieces.

For producing the centrally clamping force, the following constructions of chucks are known:

1. Chucks in which the clamping force is produced by turning a hand-operated key, and is transmitted to the clamping jaws by transmission elements of various constructions, transmission elements of the following types being known:

(a) Chucks in which the transmission to the jaws is effected by means of face spiral;

(b) Chucks in which the transmission of the clamping force is effected by means of eccentrically mounted circular arcs;

(c) Chucks in which the jaw movement is transmitted to the jaws by transmission of the clamping force through wedge racks coupled together;

(d) Chucks in which the transmission of the clamping force is effected by means of screwthreaded spindles or plates connected through bevel gears.

2. Chucks operated by compressed air, oil under pressure or electromotive power, which are fundamentally different in their construction from group 1, and by virtue of the peculiarity of their transmission elements are suitable only for power-operated drive.

In accordance with these differences in the transmission elements, a different type of contact takes place in the known chucks between the transmission element and clamping jaws, namely:

Chucks of group 1 (a) have only a linear contact between transmission element and clamping jaws, since the teeth of the jaws engaging the depressions of the face spiral must have circular arcs for smooth running in the spiral, which arcs, however, must be made to a mean dimension, on account of the diameter of the circular arc of the spiral varying on each further rotation, so that always only linear contacts take place with the face spiral; this has the disadvantage of more rapid wear of the jaws or spiral, so that the accuracy of centering of the workpiece to be machined very rapidly falls off.

Chucks of group 1 (b) may, it is true, exhibit surface contact between transmission element and clamping jaws, but only on interposing a movable intermediate member, which adapts itself to the variation of the angle of the transmission element mounted eccentrically with respect to the centre of the chuck; this has the disadvantage that, through interposition of the intermediate member, elements are used which, for manufacturing reasons, have tolerances detrimental to exact centering.

Chucks of groups 1 (c) and 1 (d), it is true, exhibit surface contact, but with the disadvantage that the transmission element does not constitute, as in 1 (a), a closed body which, at individual places, is capable of transmitting the forces acting on its other parts, but comprises a number of individually arranged elements, which have no direct force-receiving connection with each other, and are therefore supported individually in the chuck body, resulting in the production of additional frictional forces, whereby the clamping force is diminished, wear is accelerated and accuracy of centering is reduced.

A further disadvantage of all the known chuck constructions is that they are designed either for hand-operation or for power-operation, whilst selective operation of the chuck by hand or by power is not possible.

All these disadvantages are obviated by the invention.

Contrary to the known constructions, the chuck according to the invention has the following properties: Surface contact between clamping jaws and transmission element, without the interposition of an intermediate member and with elimination of friction losses and centering inaccuracies which are produced when the transmission elements connected to the clamping jaws are supported in the chuck body. Furthermore, the invention offers the advantage of selective use as hand or power operated chuck.

This is achieved by means of a ring axially displaceable in the chuck body by hand or power drive, said ring being provided with radial slots corresponding to the number of clamping jaws and allowing the latter to pass through, said slots being open towards the clamping jaws. Of the oppositely situated sides of said slots, at least one side carries helical teeth, with which mesh corresponding counter-teeth on the side faces of the clamping jaws.

A constructional example of the invention is shown in the accompanying drawings.

Fig. 1 shows a chuck in the form of a three-jaw chuck in plan.

Fig. 2 is a vertical section through Fig. 1.

Fig. 3 shows a section through the adjusting ring, with the jaws adjustable in inclined teeth.

Fig. 4 is a section according to Fig. 2 with power drive.

Fig. 5 shows a connecting member for power operation.

Figure 6:
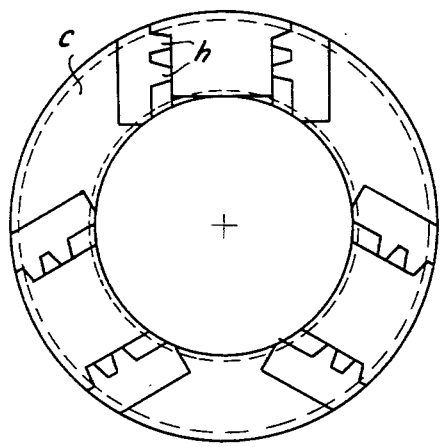
Figure 6 shows the axially movable ring in plan view.
Figure 7:
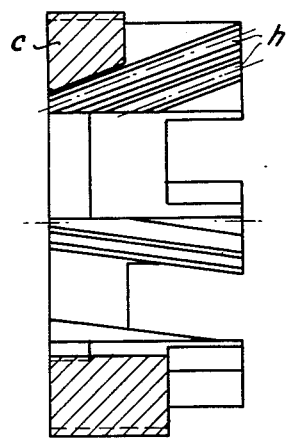
Figure 7 is a vertical section through Figure 6.
Figure 8:
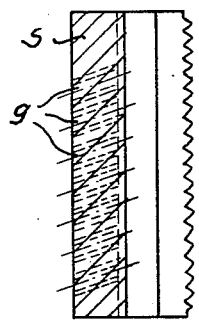
Figure 8 shows the clamping jaw in plan section.
Figure 9:
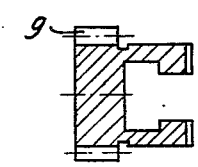
Figure 9 is a horizontal section through Figure 8.

In the chuck body $a$ are located guide slots or groove $b$ carrying the clamping jaws $s$, the number of the slots corresponding to that of the jaws, which in their turn are provided upon their sides with flat inclined teeth $g$ meshing with the inner inclined teeth $h$ of an adjusting ring $c$; thus the jaws $s$ are coupled with the ring $c$; Figs. 2, 3 and 4.

The adjusting ring $c$ has external teeth $k$, with which meshes the internal screwthread $i$ of a worm ring or wheel $d$, the latter in its turn being driven with its external worm thread $m$ by the worm $e$. Said worm $e$ may be driven by hand by means of a key and the square end $n$. The internal thread $i$ of the worm ring $d$ thereby screws itself into the external thread $k$ of the adjusting ring $c$, so that the latter is displaced axially. By this axial movement, acting through the inclined teeth $g$, $h$, the jaws $s$ are moved inwardly or outwardly and clamp or unclamp the workpiece lying between them. In the clamped condition, therefore, the teeth $g$ of the clamping jaws $s$ are in direct surface contact with those $h$ of the axially movable ring $c$, and due to the fact that all the clamping jaws transmit the clamping force in common to the axially movable ring $c$, which in its turn is supported positively by means of its axial inner and outer surfaces in the chuck body $a$, a uniformly acting centering of the workpiece is effected by all the clamping jaws.

In the case of power operation (Figs. 4 and 5) the worm ring $d$ is replaced by an axial inner coupling piece $f$ connected to a source of an axially movable power by means of connecting rod or tube $l$, so that the chuck can be converted at will from hand operation to power operation and conversely.

What I claim is:

1. A chuck, comprising a chuck body, clamping jaws having teeth on the sides thereof, an adjusting ring movable in said body and having radial grooves formed therein and open toward said jaws, the number of said grooves being equal to that of said jaws, said grooves receiving said jaws, at least one of the opposed walls of each groove having teeth meshing with the adjacent teeth of said jaws.

2. A chuck, comprising a chuck body, clamping jaws having teeth on the sides thereof, an adjusting ring movable in said body and having radial grooves formed therein and open toward said jaws, the number of said grooves being equal to that of said jaws, said grooves receiving said jaws, opposed walls of each groove having teeth meshing with the adjacent teeth of said jaws.

3. A chuck, comprising a chuck body, clamping jaws having teeth on the sides thereof, an adjusting ring axially guided in said body and having inner and outer cylindrical surfaces and radial grooves formed therein and open toward said jaws, the number of said grooves being equal to that of said jaws, said grooves receiving said jaws, at least one of the opposed walls of each groove having teeth meshing with the adjacent teeth of said jaws.

4. A chuck, comprising a chuck body, clamping jaws having teeth on the sides thereof, an adjusting ring movable in said body and having radial grooves formed therein and open toward said jaws, the number of said grooves being equal to that of said jaws, said grooves receiving said jaws, at least one of the opposed walls of each groove having teeth meshing with the adjacent teeth of said jaws and a wheel having inner teeth meshing with the outer teeth of said ring, said wheel being rotatable by hand and devoid of axial movements.

5. A chuck, comprising a chuck body, clamping jaws having teeth on the sides thereof, an adjusting ring movable in said body and having radial grooves formed therein and open toward said jaws, the number of said grooves being equal to that of said jaws, said grooves receiving said jaws, at least one of the opposed walls of each groove having teeth meshing with the adjacent teeth of said jaws, and a wheel having inner teeth meshing with the outer teeth of said ring, a source of power, and a coupling connecting said source of power with said ring.

References Cited in the file of this patent

UNITED STATES PATENTS 1,454,121    Lavoie _____ May 8, 1923